(12) United States Patent
Barth et al.

(10) Patent No.: US 12,466,014 B1
(45) Date of Patent: Nov. 11, 2025

(54) PRECISELY ADJUSTABLE ROUTER FENCE

(71) Applicant: ROCKLER COMPANIES, INC., Medina, MN (US)

(72) Inventors: Jonathan J. Barth, Maple Grove, MN (US); Jake Stoesz, Golden Valley, MN (US); Dan Wenning, Minnetonka, MN (US)

(73) Assignee: Rockler Companies, Inc., Medina, MN (US)

( * ) Notice: Subject to any disclaimer, the term of this patent is extended or adjusted under 35 U.S.C. 154(b) by 721 days.

(21) Appl. No.: 17/856,223

(22) Filed: Jul. 1, 2022

Related U.S. Application Data

(60) Provisional application No. 63/218,018, filed on Jul. 2, 2021.

(51) Int. Cl.
*B23Q 3/00* (2006.01)
*B27C 5/04* (2006.01)

(52) U.S. Cl.
CPC ............... *B23Q 3/005* (2013.01); *B27C 5/04* (2013.01)

(58) Field of Classification Search
CPC .... B27C 5/02; B27C 5/04; B27C 5/10; B23Q 3/005; B23Q 3/007
See application file for complete search history.

(56) References Cited

U.S. PATENT DOCUMENTS

| | | | |
|---|---|---|---|
| 3,991,991 A | 11/1976 | Hammer | |
| 4,735,245 A | 4/1988 | Cox | |
| 5,063,983 A | 11/1991 | Barry | |
| 5,647,258 A | 7/1997 | Brazell | |
| 5,694,994 A | * 12/1997 | Engler, III | ................ B27C 9/02 409/230 |
| 5,771,767 A | 6/1998 | Itami | |
| 5,988,242 A | 11/1999 | Minardi | |
| 6,164,176 A | 12/2000 | Larsson | |

(Continued)

FOREIGN PATENT DOCUMENTS

| | | |
|---|---|---|
| CN | 108908522 A | * 11/2018 |
| CN | 110900728 A | * 3/2020 |

(Continued)

OTHER PUBLICATIONS

Translation of WO-2014199518.*

(Continued)

*Primary Examiner* — Bobby Yeonjin Kim
(74) *Attorney, Agent, or Firm* — Mai Lauer; Westman, Champlin & Koehler, P.A

(57) ABSTRACT

An apparatus is configured for attachment to a work surface. The apparatus includes a first rail, a second rail, and a tension element connecting the first and second rails. The first rail is configured to be fixed to the work surface, the first rail having opposed first and second ends. The second rail is configured to be movable with respect to the work surface, the second rail having opposed first and second ends, wherein the first end of the first rail is hinged to the first end of the second rail. Additionally, a method of using a router fence on a table is described. The router fence includes a first rail, a second rail pivotally attached to the first rail, and a tension element connecting the first and second rails. The method includes attaching the first rail to the table; moving the second rail; and stretching the tension element.

12 Claims, 8 Drawing Sheets

(56) References Cited

U.S. PATENT DOCUMENTS

| | | |
|---|---|---|
| 7,263,922 B2 | 9/2007 | Hewitt |
| 7,930,960 B2 | 4/2011 | Duginske |
| 2020/0180087 A1* | 6/2020 | Chang .................... B27B 27/08 |

FOREIGN PATENT DOCUMENTS

| | | | | |
|---|---|---|---|---|
| GB | 2 309 664 | | 6/1997 | |
| KR | 20190096847 A | * | 8/2019 | |
| KR | 102054109 B1 | * | 12/2019 | |
| WO | 2014/199518 | | 12/2014 | |
| WO | WO-2014199518 A1 | * | 12/2014 | ............... B27C 5/04 |

OTHER PUBLICATIONS

Translation of KR-20190096847.*
Translation of CN-110900728.*
Translation of KR-102054109.*
Translation of CN-108908522.*
"Simple Router Table," Popular Woodworking Magazine, by American Woodworker Editors, posted Jul. 20, 2011 in "Projects, Questions And Answers, Techniques," https://www.popularwoodworking.com/projects/simple-router-table/, 14 pages, accessed Sep. 9, 2020.
Mullikin, Ed, "Pivoting Router-Table Fence is Simple and Effective", Nov. 15, 2011, Fine Woodworking, The Taunton Press, Inc., https://www.finewoodworking.com/2011/11/15/pivoting-router-table-fence-is-simple-and-effective, 11 pages, accessed Sep. 9, 2020.
Kevin's Workbench, "Router Table Fence with Micro-Adjustment," http://kevinsworkbench.com/router_table_fence/ index.html, www.webarchive.org capture dated Aug. 18, 2018-Nov. 2, 2019, 20 pages, accessed Sep. 9, 2020.

* cited by examiner

PRECISELY ADJUSTABLE ROUTER FENCE

CROSS REFERENCE TO RELATED APPLICATIONS

This application claims the benefit of priority of U.S. Provisional Patent Application No. 63/218,018, filed Jul. 2, 2021, entitled "Precisely Adjustable Router Fence," which is fully incorporated herein by reference.

BACKGROUND

A router fence is a wood working accessory for use with a router table for supporting an elongated workpiece relative to a router bit; the router bit is configured to impart a cut such as an edge profile onto the workpiece. Generally, the router fence is used as a guide against which a user pushes a length of the workpiece past a rotating router bit. To precisely position a cut or a depth of cut into the workpiece, it is desirable to adjust a location of the fence relative to the bit.

SUMMARY

In one aspect, an apparatus is configured for attachment to a work surface. The apparatus comprises a first rail, a second rail, and a tension element connecting the first and second rails. The first rail is configured to be fixed to the work surface, the first rail having opposed first and second ends. The second rail is configured to be movable with respect to the work surface, the second rail having opposed first and second ends, wherein the first end of the first rail is hinged to the first end of the second rail.

In another aspect, a method of using a router fence on a table is described. The router fence comprises a first rail, a second rail pivotally attached to the first rail, and a tension element connecting the first and second rails. The method comprises attaching the first rail to the table, the first rail having opposed first and second ends; moving the second rail with respect to the table, the second rail having opposed first and second ends, wherein the first end of the first rail is hinged to the first end of the second rail; and stretching the tension element connecting the first and second rails.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

The disclosure describes a router fence for use on a router table. A router fence has a guide fence face against which a user slides a workpiece for alignment past a router bit that extends up through an opening in the table. In an exemplary embodiment, a router fence has a two-piece fence rail construction that is connected by a hinge on a first end thereof. In an exemplary embodiment, a micro-adjustment knob is provided on the back of a second end thereof for pushing a first rail and its attached fence face away from a second rail, thereby pivoting about the hinge. This allows an operator to finely tune a distance of the guide fence face (and therefore a workpiece used with the guide fence face) from a router bit disposed on the router table in a horizontal dimension. In an exemplary embodiment, internal biasing elements such as springs hold the two fence rails in tension relative to one another, to minimize backlash.

Figure 1:
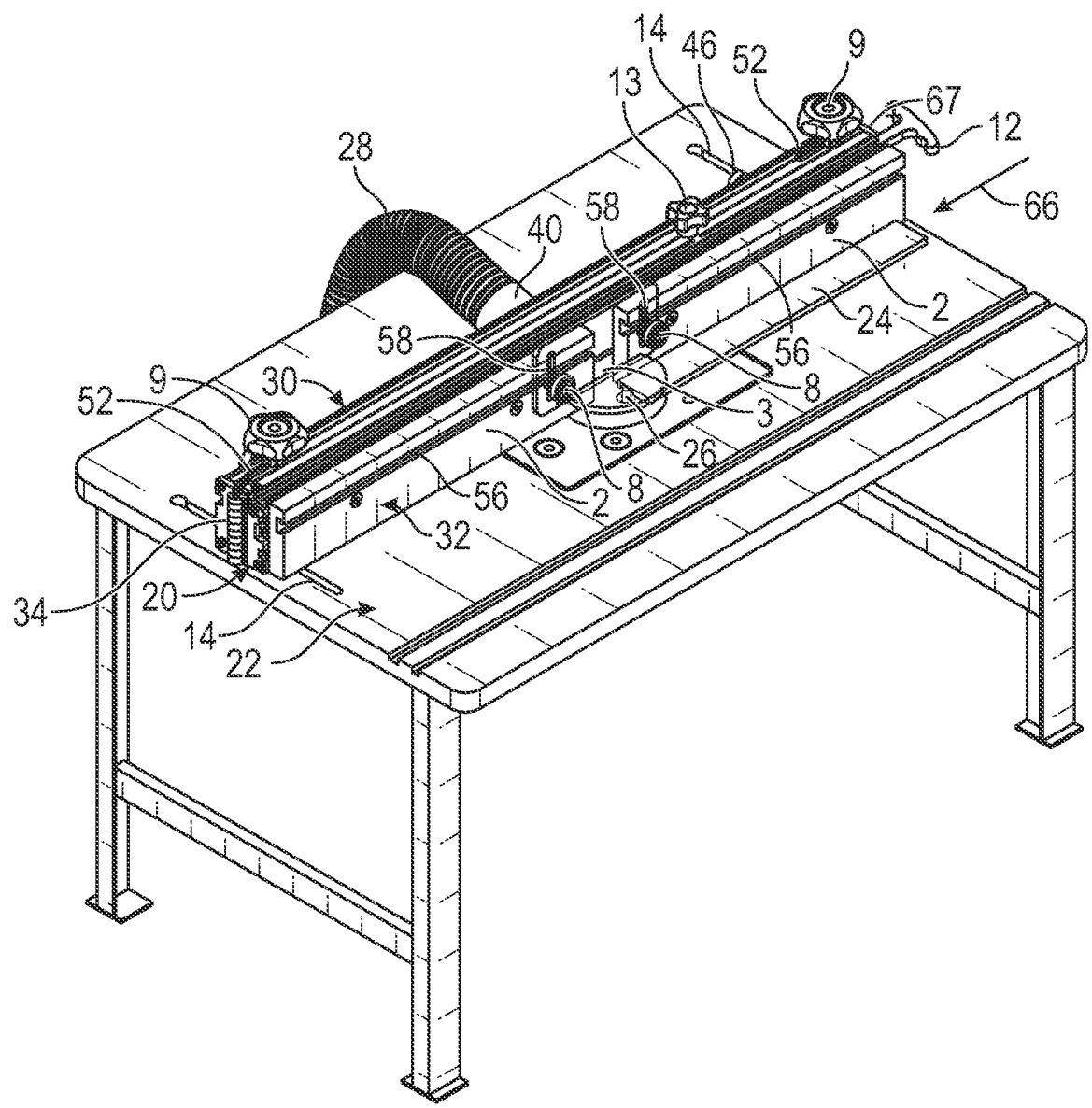
FIG. 1 is a perspective view of an exemplary router fence in use on a router table and with a workpiece.

FIG. 1 is a perspective view of an exemplary router fence 20 attached to a router table 22. A user slides a workpiece 24 past a router bit 26 that extends up through an aperture in a surface of the router table 22. Thus, the router fence 20 serves as a guide for motion of the workpiece 24 past the router bit 26 in direction 66, thereby resulting in an even and precise cutting of an edge surface (or another portion) of the workpiece 24. A dust collection hose 28 extends from a rear of the router fence 20 to allow a vacuum to draw up sawdust generated by cutting of the workpiece 24 by the router bit 26. While fence 20 is described with reference to use with a router, it is to be understood that fence 20 can be used with a variety of other equipment, including for example a saw, drill press or other woodworking equipment.

Figure 2A:
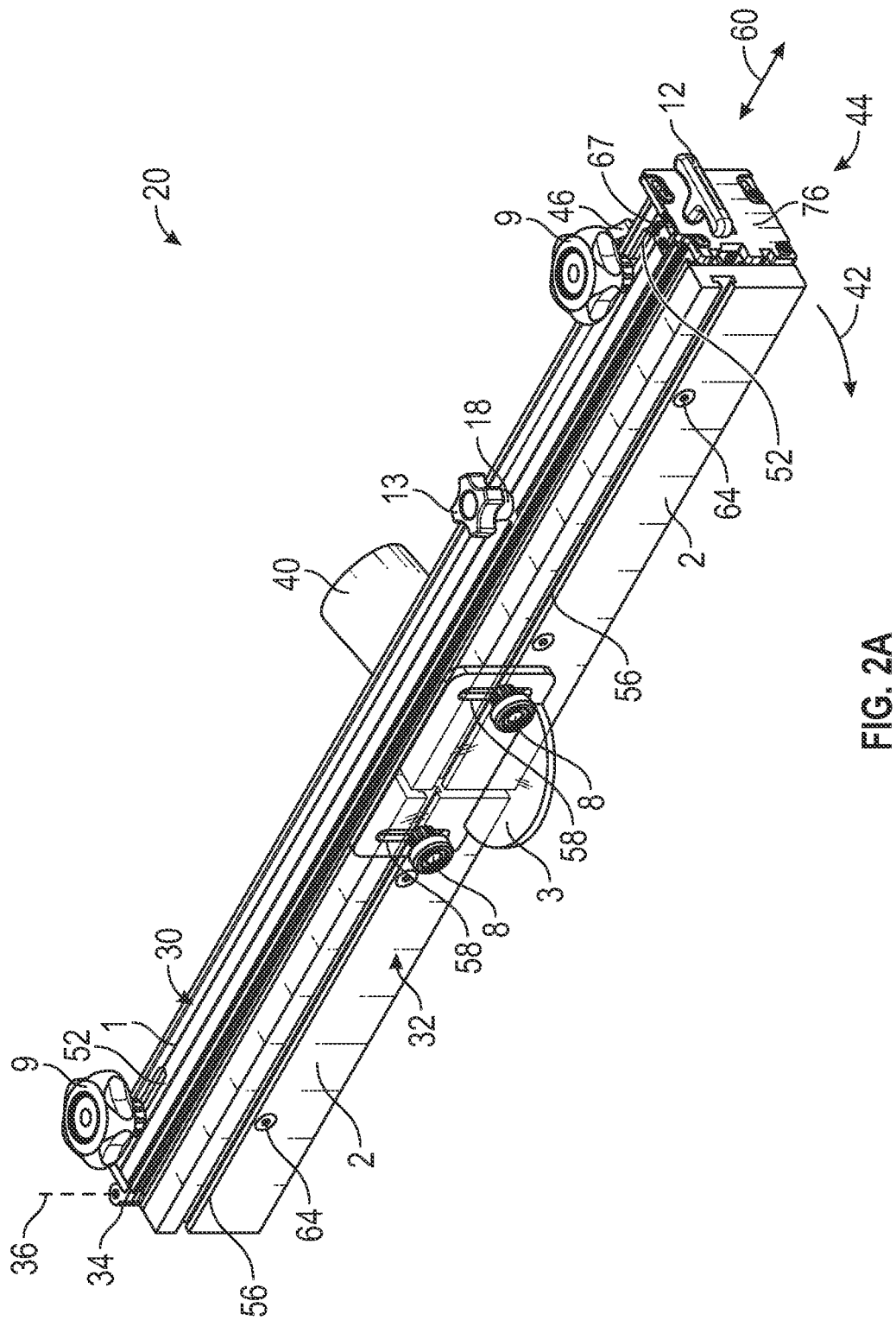
FIG. 2A is a perspective front view of the exemplary router fence.
Figure 2B:
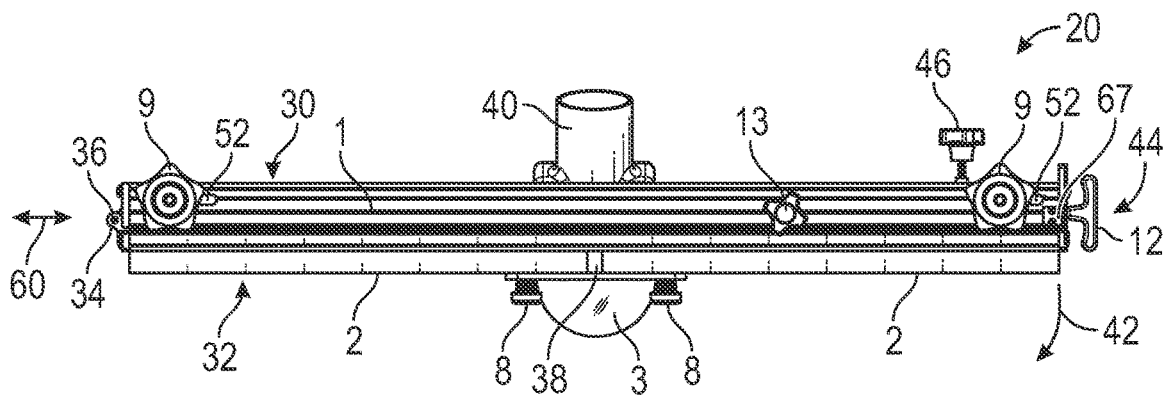
FIG. 2B is a top plan view of the exemplary router fence.
Figure 2C:
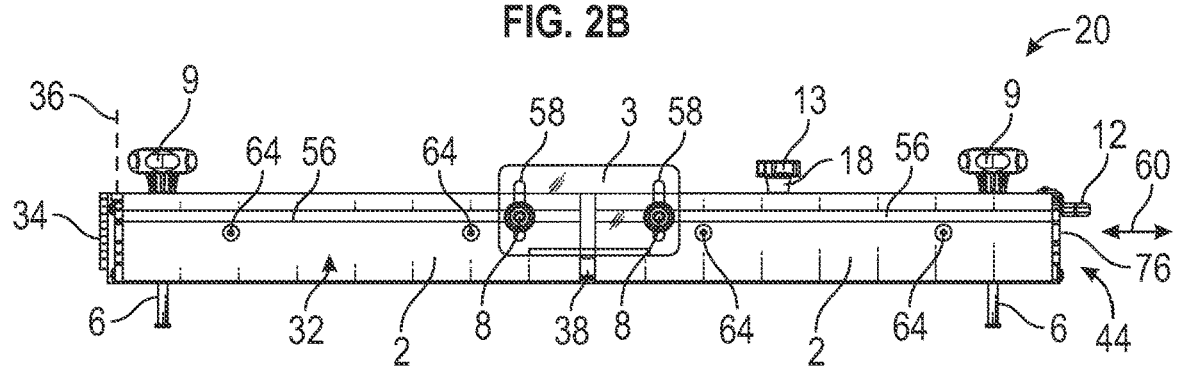
FIG. 2C is a front elevation view of the exemplary router fence.
Figure 2D:
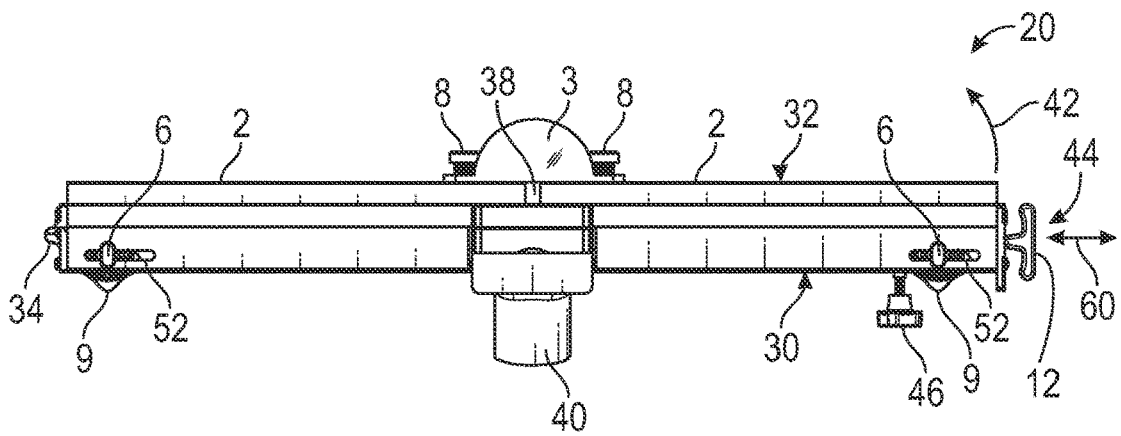
FIG. 2D is a bottom view of the exemplary router fence.
Figure 2E:
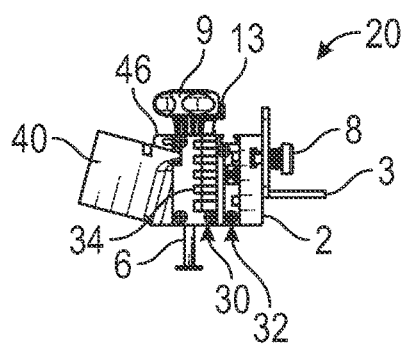
FIG. 2E is an end view of the exemplary router fence from the left side of FIG. 2C.
Figure 2F:
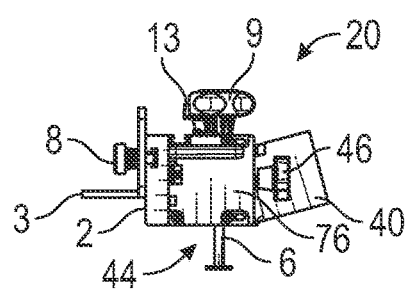
FIG. 2F is an end view of the exemplary router fence from the right side of FIG. 2C.
Figure 3:
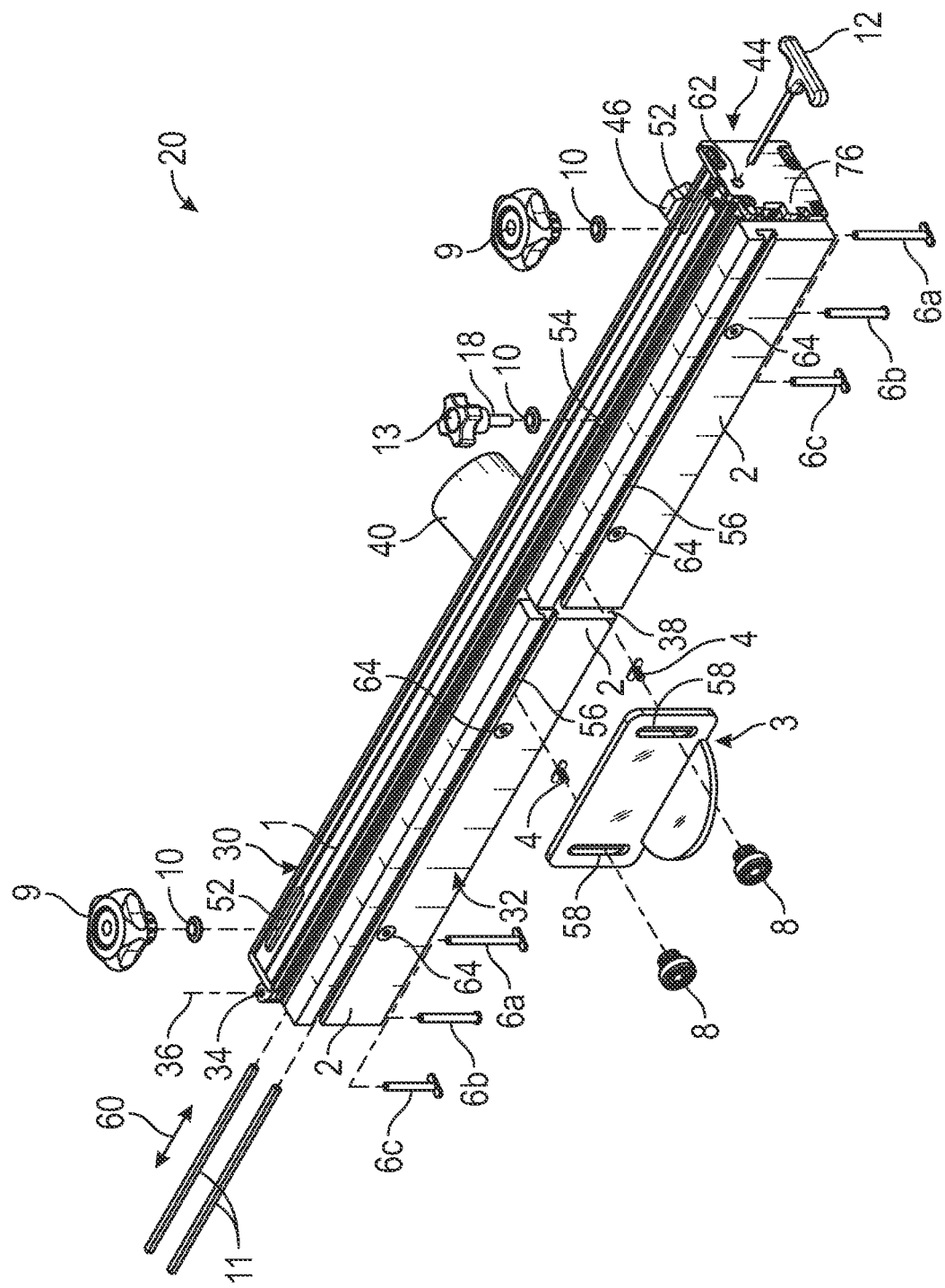
FIG. 3 is a perspective exploded view of the exemplary router fence.

As shown in FIGS. 2A-3, fence 20 in an exemplary embodiment generally has a first rail 30 and a second rail 32 attached to each other pivotally at hinge 34. In an exemplary embodiment, each of first and second rails 30, 32 is an extruded aluminum elongated rail. Hinge 34 has a vertical pivot axis 36 such that the first and second rails 30, 32 can pivot with respect to each other to adjust a position of the second rail 32 relative to a router bit that extends upward from the router table 22 at bit opening 38. Dust collection hose 28 (shown in FIG. 1) is attached to dust port 40 in a known manner.

In an exemplary embodiment, first rail 30 is positionally fixed to router table 22 by table bolt 6 (alternative variations 6a, 6b, 6c are labeled in FIG. 3) extending through slots 14 of table 22, held by the tightening of star knobs 9. In an exemplary embodiment, first rail 30 includes rail body 1. In an exemplary embodiment, second rail 32 is positionally adjustable relative to first rail 30 by the pivoting of second rail 32 about pivot axis 36 of hinge 34. Thus, while a first end of fence 20 proximate hinge 34 remains in a consistent location on table 22 relative to first rail 30, a second end of second rail 32, distal from hinge 34, moves in arc 42, labeled on FIGS. 2A, 2B and 4B. Because bit opening 38 is positioned at a midpoint between the two ends of router fence 20, motion of second rail 32 at bit opening is concentric with arc 42, and a linear adjustment position of the bit opening 38 is at about half a distance of motion of the free or unhinged end of second rail 32. In an exemplary embodiment, the maximum adjustment distance of second rail 32 away from first rail 30 at end 44 of router fence 20 (opposite the hinged end) is about one-half inch. Accordingly, a corresponding maximum distance for the adjustment of fence face 2 at bit opening 38 is about one quarter inch.

Figure 4A:
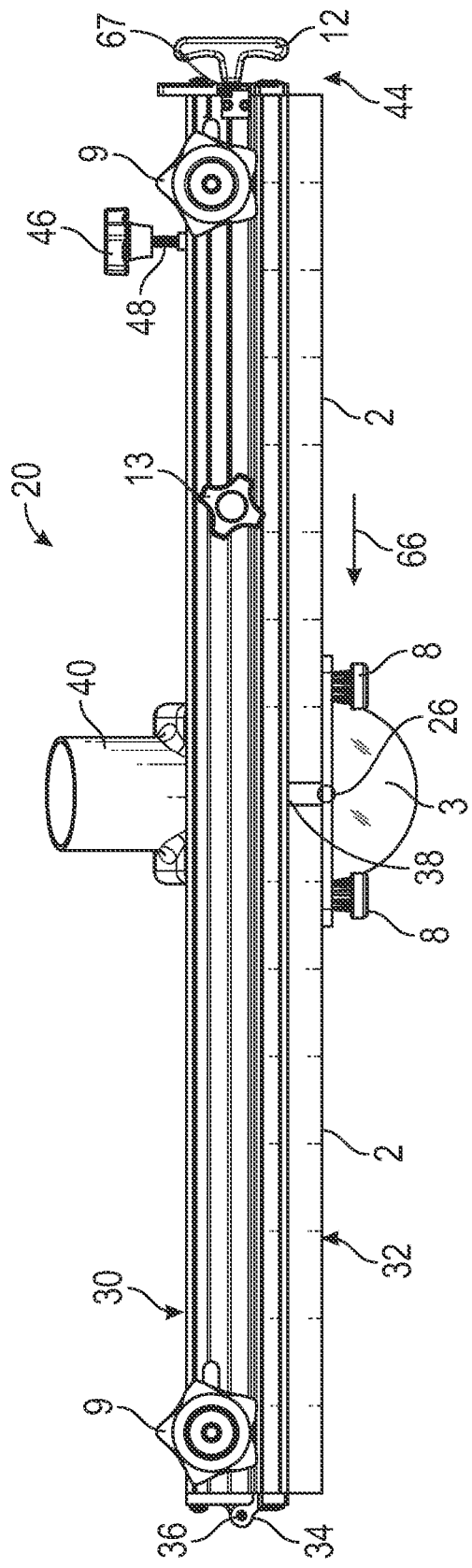
FIG. 4A is a top plan view of an exemplary router fence, similar to FIG. 2B, in a first configuration.
Figure 4B:
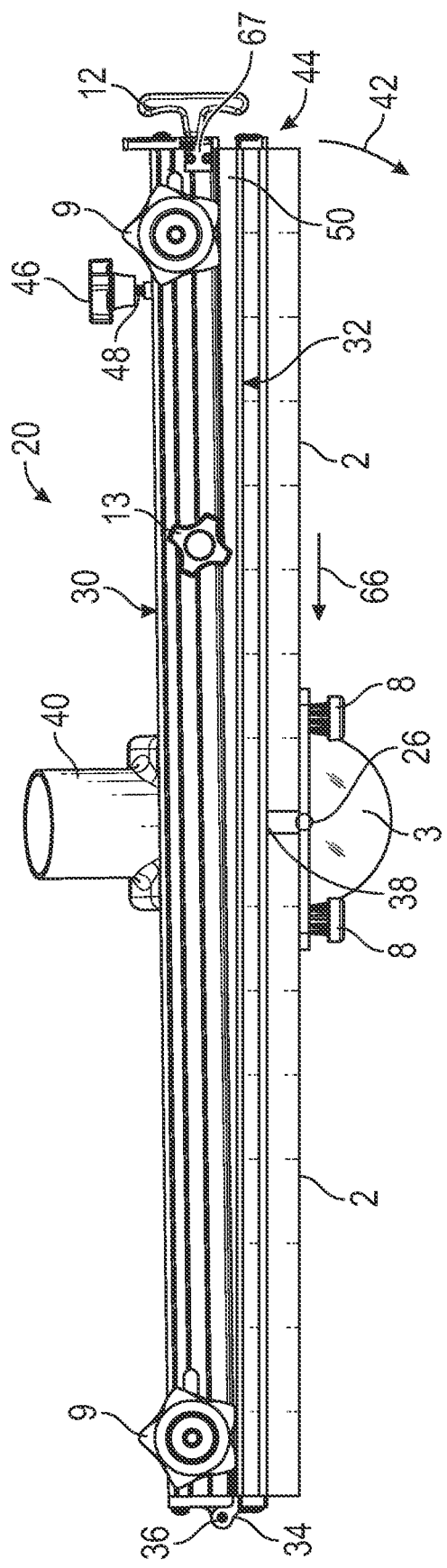
FIG. 4B shows the router fence of FIG. 4A in a second configuration.

As shown in FIG. 1, to conduct a routing operation a user slides workpiece 24 against fence face 2 of second rail 32, into contact with and past rotating router bit 26. As shown in FIGS. 4A and 4B, a position of fence face 2 relative to a router bit 26 (which extends through the table 22 at bit opening 38) is adjustable. This adjustment is accomplished by the rotation of micro adjustment knob 46, operationally attached to a threaded shaft 48. Rotation of micro adjustment knob 46 causes threaded shaft 48 to advance against second rail 32, thereby increasing a distance shown at adjustment indicator flange 50 between the first and second rails 30, 32 (as seen in FIG. 4B, exposure of flange 50 is largest at second end 44 of router fence 20). Thus, an internal gap is also created between the first and second rails 30, 32 at router bit 26, thereby adjusting a position of the fence face 2 of second rail 32 relative to the router bit 26. Accordingly, a user can finely adjust a horizontal position of a workpiece 24 being pushed along the fence face 2 relative to the router bit 26 to adjust a depth of cut of the bit 26 into the workpiece 24.

In an exemplary embodiment, bit safety guard 3 is a transparent plastic element attachable to fence face 2 with round knobs 8 and 5/16"-18×1-inch T-bolts 4. Guard 3 serves as a visual indicator of a location of router bit 26, which due to its small size may be difficult to see but can pose cutting hazards to an operator. In an exemplary embodiment, bit guard 3 is attached to router fence 20 in the following manner: a user slides the heads of two 5/16"-18×1-inch T-bolts 4 into the forward facing T-slot 56 in fence face 2. The user fits the slots 58 of the bit guard 3 over the T-bolts 4 and secures the guard 3 with a 5/16"-18×1-inch round knob 8 on each T-bolt 4.

Figure 9:
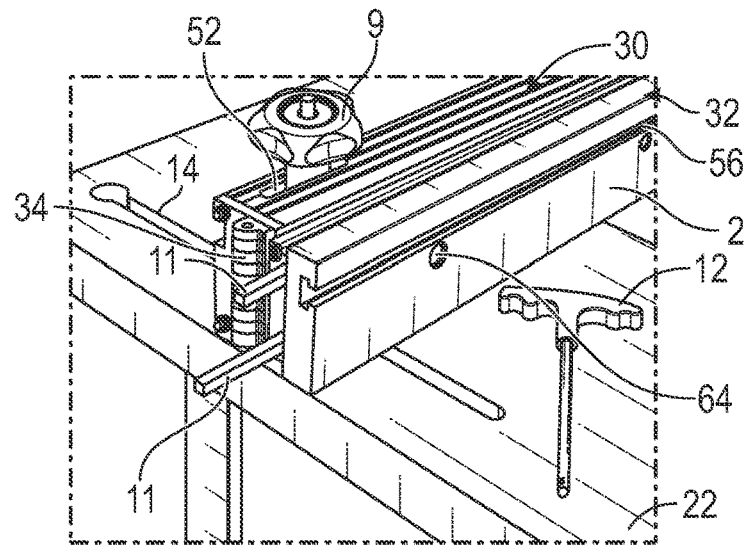
FIG. 9 is a partial perspective view of an end of an exemplary router fence, at the end shown in FIG. 2E.

As shown in FIGS. 3 and 9, star knobs 9 cooperate with T-bolts 6, which extend through slots 52 of rail body 1 and slot 14 in table 22. Additionally, 5/16" nylon washers 10 can be used with star knobs 9 to adjustably attach router fence 20 to router table 22. T-bolts 6 are capable of sliding within the longitudinal extent of slots 52 of rail body 1 and slots 14 of table 22. Once the router fence 20 is positioned in a desired location relative to table 22, a user can fix that position by tightening star knobs 9.

Three different types of bolts 6 are included in a kit for mounting the router fence 20 to a variety of router tables 22. In an exemplary embodiment, each of the bolts 6a, 6b and 6c has a 5/16" diameter shank with an 18 thread count specification. T-bolt 6a is 5 inches long; carriage bolt 6b is 4½ inches long; T-bolt 6c is 3½ inches long. A user should consider which of these bolts 6 to select depending on the user's table configuration. The selected bolt 6 is used in cooperation with star knob 9 and nylon washer 10 through the table opening 14 and slot 52 of the rail body 1 of router fence 20.

From the bottom of table 22, the user inserts an appropriate 6 into slots 14 of table 22 and slots 52 (labeled in FIG. 2D) in the bottom of rail body 1. On the top of the router fence 20 the user fits a 5/16-inch nylon washer 10 and loosely threads a 5/16-inch-18 five-star knob 9 on each of the bolts 6. When adjusting the position of the router fence 20 on the table 22, the bit opening 38 should be located at the bit 26 so that no part of the aluminum rail body 1 contacts the router bit 26. The bit guard 3 is located directly over the router bit 26 at least one half inch above the top of the bit 26 or the top of the workpiece 24 (whichever is highest) to ensure that the bit 26 does not cut into the safety guard 3. The user adjusts a forward and rearward position of router fence 20 along the table 22 by sliding along table opening slots 14. The user adjusts a transverse position of router fence 20 (bidirectionally along extent 60) along the table 22 by sliding along slots 52. When the fence 20 is in the desired position, this position is maintained by tightening the five-star knobs 9. This thus fixes the position of the first rail 30 of the router fence 20 relative to the router table 22. Though particular configurations of fasteners and adjustment devices (such as knobs) are illustrated and described, it is to be understood that other similarly functional structures can also be used.

Two fence faces 2 are removably attached to rail body 16 of the second rail 32, with the two fence faces 2 being spaced apart from each other, leaving a bit opening 38 therebetween. Fence faces 2 are sacrificial, in that they are intended to be removable for replacement as they become worn from use. As shown in FIG. 2, a width of bit opening 38 is adjustable because each of the fence faces 2 can be slid bidirectionally along longitudinal extent 60 to adjustably attach to the rail body 1. To facilitate such adjustment, a user can remove the hex key 12 from its storage bore 62 in rail body 1 and use it to loosen each of the flat head hex screws 64 that secure the adjustable fence face 2 onto the body of second rail 32. The user positions each of the fence faces 2 close to the bit 26 but not touching it, and tightens the flat head hex screws 64 to fix the adjustable fence faces 2 in the desired locations on second rail 32. Reducing the size of the bit opening 38 is advantageous, since the smaller the size of the bit opening 38 (between the two fence faces 2) around the bit 26, the more structure and support offered to the workpiece 24 by the router fence 20, allowing a user to achieve a clean cut on the workpiece 24.

As shown in FIGS. 1 and 4A, a user pushes a workpiece 24 in direction 66, wherein one edge of the workpiece is supported against fence face 2. As shown in FIG. 4A, bit 26 protrudes at least partially past fence face 20 to impart a cut into the edge of the workpiece supported against fence face 2. If the user determines that this depth of cut is too great, the depth at which bit 26 cuts into the workpiece can be adjusted (decreased) by pivoting second rail 32 relative to first rail 30 about hinge 34 and pivot axis 36. Thus, as shown in a comparison of FIG. 4B and FIG. 4A, the second rail 32 swings in an arc 42 at end 44, thereby decreasing a depth of cut of router bit 26 into a workpiece 24 supported at the new location of fence face 2 at bit opening 38. This depth of cut fine tuning or micro adjustment is made by turning the micro adjustment knob 46, thereby pushing second rail 32 away from first rail 30 near end 44, which is opposite hinge 34. If it is determined that the adjustment is too large, the user turns micro adjustment knob 46 in the opposite direction, thereby drawing second rail 32 back toward first rail 30 and decreasing the spacing therebetween. This allows a fine-tuned forward or backward adjustment of the fence face 2 position without having to move the rest of the router fence 20 (i.e., first rail 30 stays locked in place on router table 22 via knobs 9 and associated bolt 6). Whether the motion is forward or backward depends on how the user initially sets the micro adjustment knob 46 on the router fence 20.

For example, if the user desires to route an edge profile on a workpiece 24 that is prone to router burn, the user may wish to accomplish the routing in several lighter passes of workpiece 24 past router bit 26, moving the fence face 2 backward (i.e., toward first rail 30) with each pass. For this case, the user may start with the router fence 20 in the configuration of FIG. 4B, and gradually adjust the position of second rail 32 relative to first rail 30 to the configuration shown in FIG. 4A, thereby allowing for a deeper cut with each pass.

Figure 7:
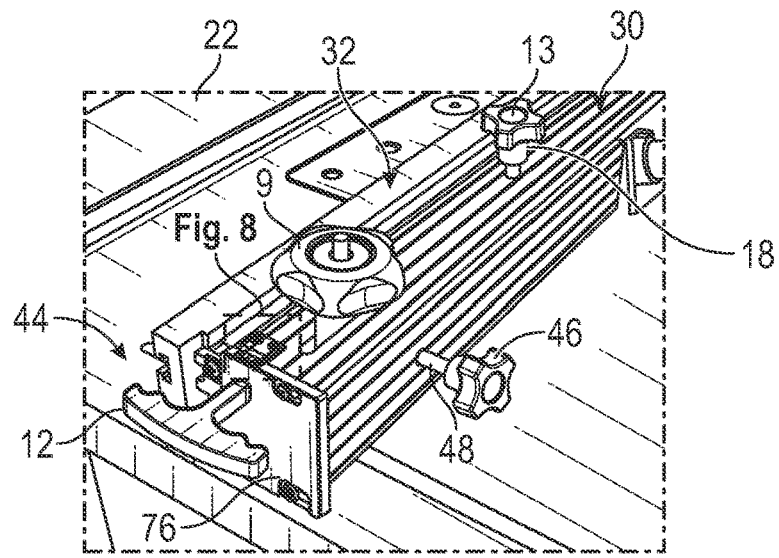
FIG. 7 is a partial perspective end view, similar to FIG. 6 but showing the end plate attached to the exemplary router fence.
Figure 8:
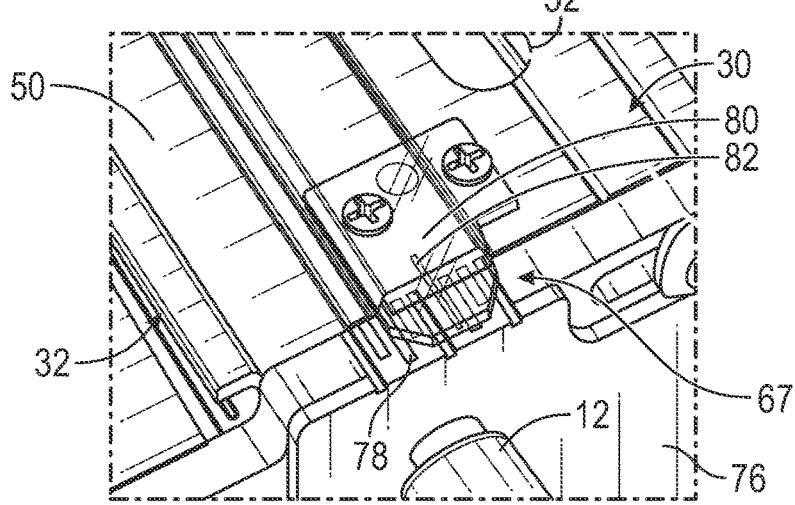
FIG. 8 is a top perspective view of a portion of the router fence of FIG. 7 (designated with the reference "FIG. 8" in FIG. 7), showing a gauge on the exemplary router fence.

To allow for the micro adjustment function, a user loosens the fence locking knob 13 and slightly turns the micro adjustment knob 46 on the back of the fence to move second rail 32 forward or backward (relative to first rail 30) as desired. The adjustment can be visually tracked using the indicator and scale gauge 67 shown more clearly in FIGS. 7 and 8. In an exemplary embodiment, scale gauge 67 includes measurement markings 78 on a top surface of end plate 76 that moves with second rail 32. Scale gauge 67 also has a transparent tab 80 with a colored indicator line 82 thereon, and the tab 80 is fixed to first rail 30. Thus, a degree of movement of second rail 32 at end 44 relative to first rail 30 is easily tracked by visually noting relative positions of indicator line 82 relative to measurement markings 78. Measurement markings 78 can be provided in metric units, standard US units, or other length increments.

The longitudinal midpoint of the router fence 20, where the bit opening 38 and bit 26 are located, will move half the distance shown with the indicator lines. When the relative locations of first rail 30 and second rail 32 have reached the desired point, the user tightens the fence locking knob 13 to secure the two rails 30, 32 in their relative positions. In an exemplary embodiment, a 5⁄16" nylon washer 10 is positioned onto the post of the fence locking knob 13 that is threaded into aperture 54 in the top of the rail body 1. As fence locking knob 13 is tightened, the bottom end of its threaded shaft 18 contacts and frictionally engages with flange 72 of rail body 16 of second rail 32, visible in FIGS. 5 and 6, thereby fixing the adjusted distance between first rail 30 and second rail 32.

While particular configurations of fasteners and other elements are described, it is to be understood that other known structures can be used rather than the specific bolts, knobs, washers, springs, materials and other described elements.

Figure 5:
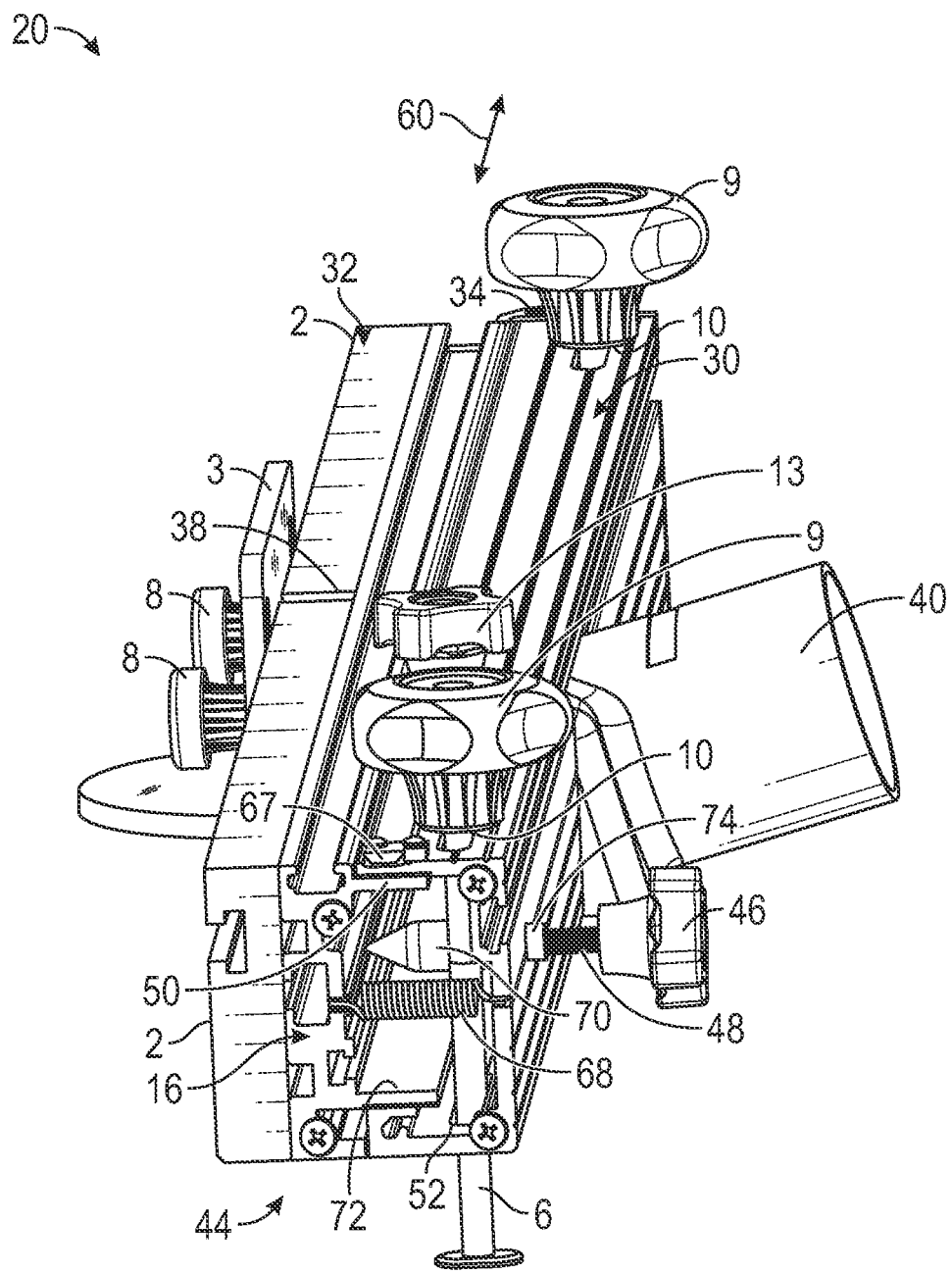
FIG. 5 is an end perspective view, taken from a similar vantage point as FIG. 2F, with an end plate removed to show an internal biasing device.
Figure 6:
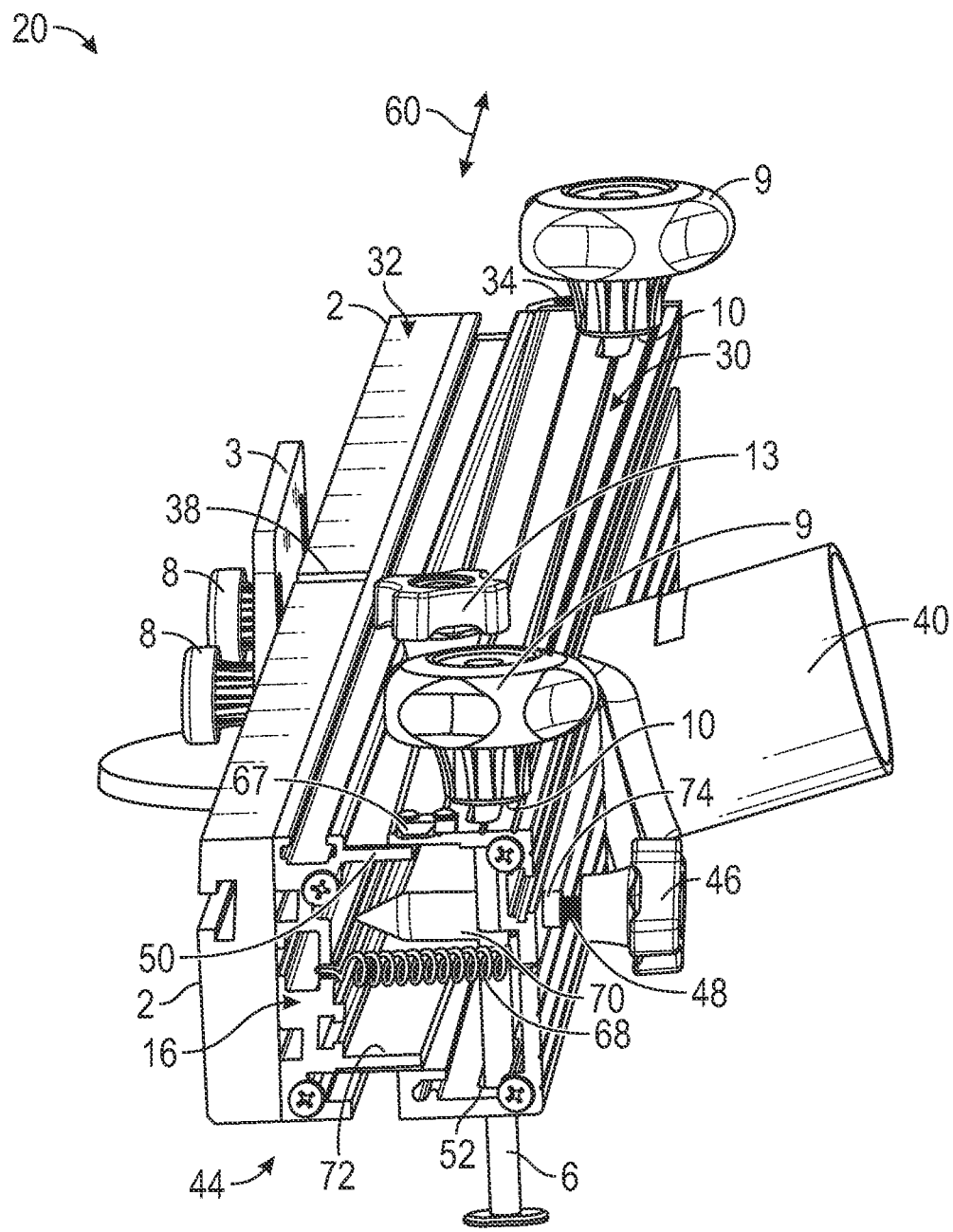
FIG. 6 is similar to FIG. 5 but shows the exemplary router fence in the second configuration of FIG. 4B.

FIG. 5 is an end perspective view from end 44 of a router fence 20 configured as in FIG. 4A. FIG. 6 is an end perspective view of a router fence configured as in FIG. 4B. In each of FIGS. 5 and 6, an end plate 76 of the router fence is removed so that internal elements are visible. As shown in FIGS. 4A and 5, in the configuration of router fence 20 in which longitudinal extents of first rail 30 and second rail 32 are essentially parallel, a biasing tension element 68 is in its default configuration. In an exemplary embodiment, biasing element 68 is a helical coil tension spring, though other configurations of tension devices can also be used. As shown in a comparison of FIGS. 5 and 6, turning micro adjustment knob 46 in one direction advances forcer 70 against rail body 16 of second rail 32. This in turn increases a gap between first rail 30 and second rail 32 at end 44, as visible at adjustment indicator flange 50 (when the fence locking knob 13 is loosened to allow adjustment of the position of second rail 32 relative to first rail 30). A top surface of adjustment indicator flange 50 may be provided with a high visibility color to allow a user to more easily see this adjustment and the spacing created between first rail 30 and second rail 32, as depicted in FIG. 4B. Concurrently, biasing element 68 stretches as the first rail 30 and second rail 32 spacing increases, as shown in FIG. 6. When a desired configuration of router fence 20 is reached, the user tightens fence locking knob 13 to retain the first rail 30 and second rail 32 in their desired relative positions. When the user wishes to change that position, such as allowing a return to the configuration of FIGS. 4A and 5, for example, the user loosens the fence locking knob 13 and turns the micro adjustment knob 46 in the opposite direction. As the biasing element 68 returns to its unstretched configuration, it pulls the second rail 32 closer to the first rail 30 at end 44. When a desired position of these elements has been reached, the fence locking knob 13 can be tightened again to fix the positions of second rail 32 relative to first rail 30.

Thus, the biasing element 68 serves to allow for very fine adjustments of a horizontal position of the fence face 2 relative to a router bit 26 by pulling against the separating force of micro adjustment knob 46, thereby presenting overly great adjustments. Moreover, the biasing element 68 pulls the second rail 32 toward the first rail 30 at end 44 when pressure from forcer 70 is released by reverse rotation of micro adjustment knob 46. Rotation of micro adjustment knob 46 advances or retracts a threaded shaft 48 into and out of an internally threaded stub 74 of first rail 30. This motion advances and retracts forcer 70 from contact with an interior face of rail body 16 of second rail 32.

While only a single biasing element 68 is viable, it is to be understood that a series of multiple biasing elements 68 may be provided to attach the first rail and second rails 30, 32 to each other, the biasing elements providing for tension when the rails are pivoted apart at hinge 34. Such a series of biasing elements can be spaced along a length of router fence 20, such as with even spacing along the longitudinal direction 60. Moreover, multiple biasing elements 68 can be provided at a single longitudinal location along router fence 20, such as two springs, one located above the other, for example.

In an exemplary embodiment, joiner or jointer bars 11 are conveniently stored in a compartment in second rail 32, as shown in FIGS. 3 and 9. In an exemplary embodiment, each jointer bar 11 has a rectangular cross section that provides a ⅟₃₂ inch offset for cutting a flat side edge on a workpiece. For example, in one configuration, the two fence faces 2 are co-planar with respect to each other. To provide an ⅟₃₂ inch offset of the fence face 2 near hinge 34 (referred to as the "left" fence face 2) relative to the fence face 2 near end 44 (referred to as the "right" fence face 2), hex key 12 is rotated in screws 64 to loosen the left fence face 2 from the rail body 16. Then each of the jointer bars 11 is pulled out of the rail body 16, rotated ninety degrees, and reinserted into the rail body 16. The left fence face is tightened back against the jointer bars 11 using the hex key 12 in screws 64. Because the cross-section of each jointer bar is ⅟₃₂ inch wider in one dimension than in the other dimension, this step allows for quick and accurate offsetting of the left fence face forward of the right fence face by ⅟₃₂ inch. When using this configuration to cut a straight edge on a workpiece 24, the workpiece 24 is pushed in direction 66 past router bit 26 with the workpiece 24 in contact with the left fence face 2 and with a ⅟₃₂ inch clearance between the workpiece 24 and the right fence face 2. This clearance accommodates for slight unevenness in the uncut side edge portion of the workpiece 24. Any unevenness is cut to a flat surface when the workpiece passes the router bit 26, which is chosen to cut the entire thickness of the workpiece 24. Fully cut workpieces then have flat edges that can be nearly seamlessly joined to each other.

Exemplary, non-limiting embodiments of an apparatus 20 are described. In an exemplary embodiment, apparatus 20 is configured for attachment to a work surface 22 and comprises a first rail 30, a second rail 32, and a tension spring 68 connecting the first and second rails 30, 32. The first rail 30 is configured to be positionally fixed to the work surface 22, the first rail 30 having opposed first and second ends. The second rail 32 is configured to be movable with respect to the work surface 22, the second rail 32 having opposed first and second ends, wherein the first end of the first rail is hinged to the first end of the second rail.

In an exemplary embodiment, a first knob 46 is configured such that its rotation results in the second end of the second rail 32 moving relative to the first rail 30. In an exemplary embodiment, the first knob 46 is attached to a first shaft 48 that threadably engages the first rail 30 at stub 74. In an exemplary embodiment, a forcer 70 attached to the first shaft 48 is configured to contact the second end of the second rail 32, such as at rail body 16.

In an exemplary embodiment, moving the second end of the second rail 32 away from the first rail 30 stretches the tension spring. In an exemplary embodiment, a second knob 13 is attached to a second shaft 18, wherein the second shaft 18 extends through an aperture 54 of the first rail 30 and is configured to selectively frictionally engage the second rail 32. In an exemplary embodiment, apparatus 20 comprises an adjustment indicator flange 50, wherein a visible portion of the flange 50 changes dependent on a relative position of the second rail 32 relative to the first rail 30.

In an exemplary embodiment, a transparent bit guard 3 is configured for attachment to the second rail 32. In an exemplary embodiment, the second rail 32 comprises a fence face 2 configured for adjustable mounting to a rail body 16. In exemplary embodiments, apparatus 20 comprises a hex key 12 and/or jointer bar 11. In an exemplary embodiment, the first rail 30 comprises a dust port 40. In an exemplary embodiment, the second rail 32 comprises a bit opening 38 between two fence faces 2, the bit opening 38 disposed proximate a longitudinal midpoint of the second rail 32.

In an exemplary embodiment, a method of using a router fence 20 on a table 22 comprises attaching the first rail 30 to the table 22, moving the second rail 32 with respect to the table 22, and stretching a tension spring 68 connecting the first and second rails. In an exemplary embodiment, moving the second rail 32 comprises rotating a knob 46 in a first direction such that a shaft 48 connected to the knob 46 pushes against the rail body 16 near second end of the second rail 32. In an exemplary embodiment, rotating the knob 46 in a second direction opposite the first direction results in return of the tension spring toward an unstretched configuration, thereby pulling the second end of the second rail 32 toward the first rail 30. In an exemplary embodiment, moving the second rail 32 results in an open configuration of the router fence 20, shown in FIGS. 4B and 6, the method comprising maintaining the open configuration. In an exemplary embodiment, maintaining the open configuration comprises rotating a knob 13 of the first rail 30 such that a shaft 18 connected to the knob 13 frictionally engages the second rail 32. In an exemplary embodiment, the second rail 32 comprises a rail body 16 and a fence face 2, the method comprising changing a location of the fence face 2 on the rail body 16. In an exemplary embodiment, the method comprises removing a hex key 12 from the router fence 20 and using the hex key 12 to adjust the location of the fence face 2 on the rail body 16.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa. All references mentioned in this disclosure are hereby incorporated by reference.

The invention claimed is:

1. An apparatus configured for attachment to a work surface and comprising:
   a first rail configured to be fixed to the work surface, the first rail having opposed first and second ends;
   a second rail configured to be movable with respect to the work surface, the second rail having opposed first and second ends, wherein the first end of the first rail is hinged to the first end of the second rail; and
   a tension element connecting the first and second rails, wherein:
   increasing a distance between the second end of the first rail and the second end of the second rail stretches a length of the tension element by the distance; and
   the tension element remains connected to the first and second rails.

2. The apparatus of claim 1 comprising a first knob configured such that its rotation results in the second end of the second rail moving relative to the first rail.

3. The apparatus of claim 2 wherein the first knob is attached to a first shaft that threadably engages the first rail.

4. The apparatus of claim 3 comprising a forcer attached to the first shaft, wherein the forcer is configured to contact the second end of the second rail.

5. The apparatus of claim 2 comprising a second knob attached to a second shaft, wherein the second shaft extends through an aperture of the first rail and is configured to selectively frictionally engage the second rail.

6. The apparatus of claim 1 comprising an adjustment indicator flange, wherein a visible portion of the adjustment indicator flange changes dependent on a relative position of the second rail relative to the first rail.

7. The apparatus of claim 1 comprising a transparent bit guard configured for attachment to the second rail.

8. The apparatus of claim 1 wherein the second rail comprises a fence face configured for adjustable mounting to a rail body.

9. The apparatus of claim 1 comprising a hex key.

10. The apparatus of claim 1 comprising a jointer bar.

11. The apparatus of claim 1 wherein the first rail comprises a dust port.

12. The apparatus of claim 1 wherein the second rail comprises a bit opening proximate a longitudinal midpoint of the second rail.

\* \* \* \* \*